March 26, 1940.  A. C. ARBOGAST  2,195,069
VALVE
Filed July 11, 1938
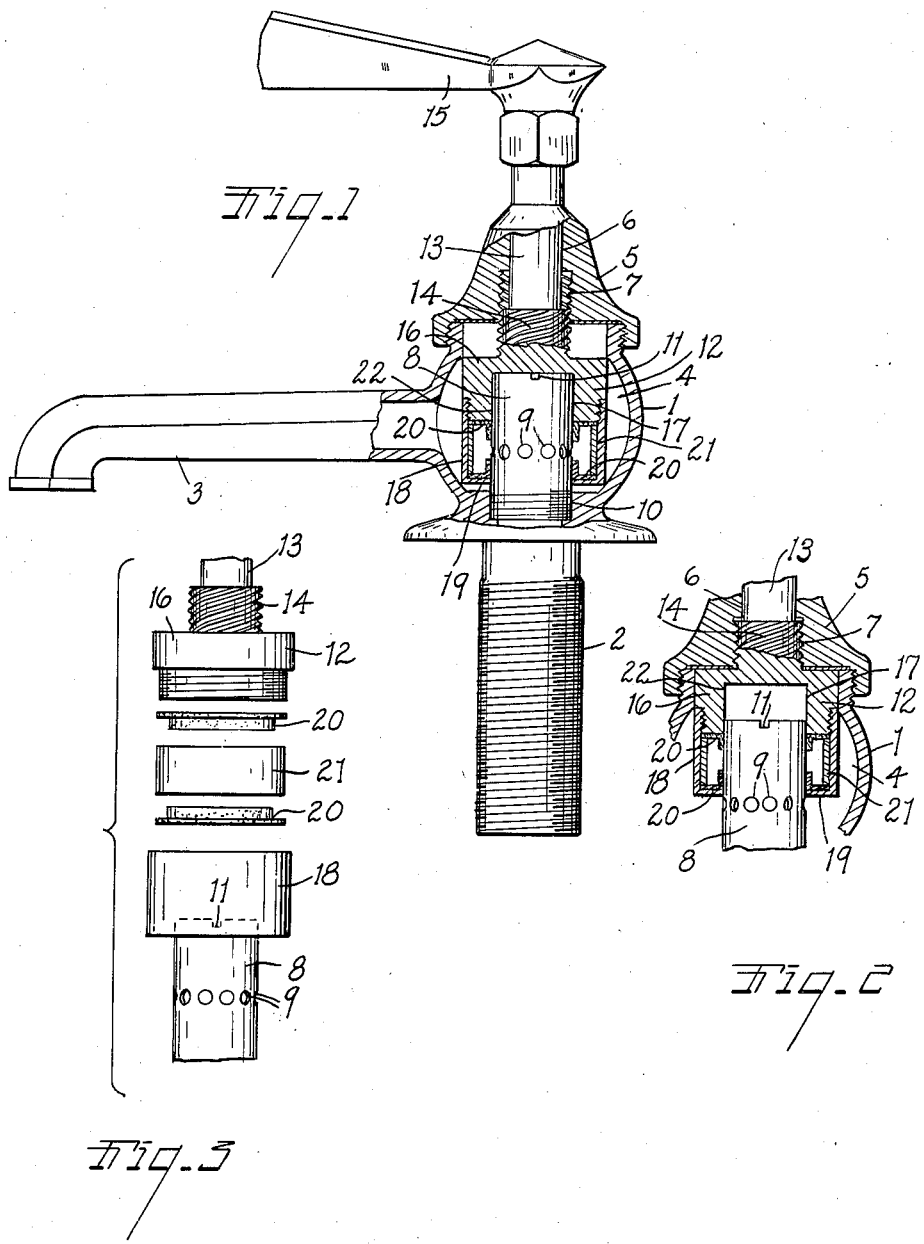
INVENTOR.
Alfred C. Arbogast
BY Earl & Chappell
ATTORNEYS Patented Mar. 26, 1940

2,195,069

UNITED STATES PATENT OFFICE 2,195,069

VALVE

Alfred C. Arbogast, Elkhart, Ind., assignor to Northern Indiana Brass Company, Elkhart, Ind., a corporation of Indiana Application July 11, 1938, Serial No. 218,603

2 Claims. (Cl. 251—80)

This invention relates to improvements in valves.

The main objects of this invention are:

First, to provide an improved valve structure which is well adapted for water faucets and the like, is easy of operation and not likely to become stuck or wedged though used for a substantial period of time.

Second, to provide a valve which is not likely to leak, is of very long life, and easy of operation.

Third, to provide a valve in which the water supply pressure acts to seal the valve when it is in closed position.

Fourth, to provide a valve having these advantages which is simple and economical in its parts and the parts easily assembled.

Objects relating to details and economies of the invention will appear from the description to follow. The invention is defined and pointed out in the claims.

A preferred embodiment of the invention is illustrated in the accompanying drawing, in which:

Fig. 1 is a side elevation of a water faucet embodying my invention, partially in vertical central section with the valve in closed position.

Fig. 2 is a fragmentary view partially in vertical section with the valve in open position.

Fig. 3 is an exploded or disassembled view of certain of the valve parts.

The embodiment of my invention illustrated is designed as a water faucet and comprises the valve casing 1 having an extension 2 to facilitate coupling to a desired water supply. The discharge spout or faucet 3 opens to the valve chamber 4. A cap 5 is threaded upon the upper end of the body of the valve casing and has a bore 6 adapted to receive a valve stem, the lower end of the bore being enlarged and internally threaded at 7.

Disposed centrally within the valve casing is a cylindrical supply head 8 having an annular series of lateral discharge ports 9. Intermediate its ends, this supply head is preferably threaded into a suitable socket 10 provided therefor at the base of the casing. The transverse kerf 11 in the upper end of the head is designed to receive a tool for inserting the head or removing it should occasion require.

The valve 12 is of the plunger type—that is, it is designed to reciprocate upon the head or relative thereto and is also, in the embodiment illustrated, designed to rotate upon the head.

The stem 13 has threads 14 of relatively high pitch coacting with the internal threads 7 to provide for quick opening and closing of the valve. A handle 15 is provided at the outer end of the stem.

The valve comprises a body portion 16 having a central bore 17 to receive the head 8 and a skirt portion 18 preferably formed as a sheet metal stamping or drawn element, this being threaded upon the body portion and provided with an inturned flange 19 at its lower end. This provides a chamber within the valve and below the bore 17 thereof, this chamber being designed to receive the packings 20 which are of the cupped leather type, the upper packing being seated against the lower end of the body portion 16 and the lower packing against the flange 19.

A clamping ring 21 is arranged between these packings and securely clamps them in their seated position described with their flange portions slidably embracing the side of the cylindrical head 8 and spaced so that when the valve is in closed position the discharge openings 9 are between the packings and the water pressure acts to seat the packings or urge the flange portions of the packings against the side of the delivery head. When the valve is opened or raised or moved outwardly, the delivery openings of the supply head are uncovered, as shown in Fig. 2, and the water is free to escape through the discharge 3. As the water pressure is off the packings during the greater portion of the movement of the valve, there is little wear on the packings, and threaded leather packings of this cupped type are known which do not become hard or unyielding with age and are very durable.

To further insure against tilting or canting, the valve casing is preferably provided with a guide portion 22 at its upper end receiving the valve as it is retracted from its closed position.

When the water under pressure passes through the ports 9 the pressure forces the cupped packings away from the holes, thereby eliminating any possibility of their being drawn into the holes or engaged in the holes, which might cause excessive wear and I consider this an important factor in the long life of the packings.

Another feature of advantage is that the reciprocating movement of the valve parts wipes off any corrosion or deposit such as are present in most water systems. It is found that the packings are not likely to become loaded with deposits or to stick as a result of corrosion or deposits. It is also to be noted that there are positive stops for the reciprocating valve member which maintain the valve handle in proper position as well as moving the parts effectively to and from open position.

I have illustrated my improvements in an embodiment which I have found highly practical and as embodied in a water faucet type of valve. I have not attempted to illustrate adaptation to various types of valves as it is believed that this disclosure will enable those skilled in the art to embody or adapt my improvements as may be desired.

Having thus described my invention, what I claim as new and desire to secure by Letters Patent, is:

1. In a valve, the combination with a valve casing having a valve chamber with a lateral discharge and provided with a removable cap having a stem receiving bore, the lower portion of said bore being enlarged and internally threaded, of a cylindrical supply head disposed centrally within said valve chamber and having an annular series of lateral opening discharge openings intermediate its ends, a valve reciprocatingly and rotatively mounted in said casing to embrace said head and comprising a body portion slidably and rotatably receiving the upper end of the head, and a skirt portion detachably secured to said body portion and having an inwardly projecting flange at its lower end, said portions providing an annular chamber and opening to said head, a pair of facing cupped packings arranged within the chamber in said valve, one of said packings being in supporting engagement with the inner end of said body portion and the other with the flange of said skirt portion, a clamping ring between and in supporting engagement with said packings, and a stem for said valve threaded to coact with the internal threads of said valve casing cap, the threads being of relatively high pitch to facilitate rapid opening and closing of said valve, said casing being provided with a guide for the body portion of said valve supplementing the guiding engagement of said valve with said supply head.

2. In a valve, the combination of a supply head having a discharge opening intermediate its ends, a casing having a valve chamber concentric with said supply head, a plunger valve reciprocatingly mounted in said casing to embrace said head and comprising a body portion and a skirt portion having an inwardly projecting flange at its inner end, said portions providing an annular chamber and opening to said head, and a pair of facing cupped packings arranged within the chamber in said valve, one of said packings being in supporting engagement with the inner end of said body portion and the other with the flange of said skirt portion, there being a clamping ring between said packings, said discharge openings of said supply head being between said packings when the valve is in closed position.

ALFRED C. ARBOGAST.